(12) United States Patent
Dietzen et al.

(10) Patent No.: US 7,045,082 B2
(45) Date of Patent: May 16, 2006

(54) PRODUCTION OF FOAM WEBS FROM HIGH-TEMPERATURE-RESISTANT POLYSULFONES OR POLYETHER SULFONES

(75) Inventors: Franz-Josef Dietzen, Hassloch (DE); Dietrich Scherzer, Neustadt (DE); Joachim Queisser, Mannheim (DE); Swen Rück, Worms (DE); Gerd Ehrmann, Deidesheim (DE); Wolfgang Kratzmüller, Lohfelden (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 373 days.

(21) Appl. No.: 10/319,642

(22) Filed: Dec. 16, 2002

(65) Prior Publication Data

US 2004/0212119 A1    Oct. 28, 2004

(30) Foreign Application Priority Data

Dec. 20, 2001   (DE) ................................ 101 62 602

(51) Int. Cl.
*B29C 44/20*   (2006.01)

(52) U.S. Cl. ............................................. 264/50; 264/53

(58) Field of Classification Search ................ 264/51, 264/53, 45.9, 50
See application file for complete search history.

(56) References Cited

U.S. PATENT DOCUMENTS

| 4,275,186 A | | 6/1981 | Kawakami et al. | |
|---|---|---|---|---|
| 4,308,352 A | * | 12/1981 | Knaus | ........................ 521/79 |
| 5,017,622 A | * | 5/1991 | Bland et al. | .................. 521/79 |

FOREIGN PATENT DOCUMENTS

DE          42 07 057       9/1993

* cited by examiner

*Primary Examiner*—Allan R. Kuhns
(74) *Attorney, Agent, or Firm*—Novak Druce Deluca & Quigg, LLP; Jason D. Voight

(57) ABSTRACT

The invention relates to a process for producing foam webs by foam extrusion of a mixture of a polysulfone or polyether sulfone and a volatile blowing agent, where the blowing agent is water or a mixture of water with an inert gas or organic liquid, e.g. an alcohol or a ketone.

3 Claims, No Drawings

PRODUCTION OF FOAM WEBS FROM HIGH-TEMPERATURE-RESISTANT POLYSULFONES OR POLYETHER SULFONES

The invention relates to a process for producing foam webs from a polysulfone or a polyether sulfone by extruding a mixture of the thermoplastic with from 1 to 10% by weight of a volatile blowing agent, under pressure into the open atmosphere.

A process of this type is described in DE-A 4 207 257. Blowing agents used there are oxygen-containing aliphatic liquids, such as alcohols, ketones, esters, and ethers, in particular acetone. However, a problem arising is that the use of these readily combustible liquids represents a considerable safety risk at the high temperatures used.

It is an object of the present invention to eliminate this risk or at least to reduce it.

We have found that this object is achieved by using, as blowing agent, water or a mixture of water with up to 200 parts by weight, based on 100 parts by weight of water, of an inert gas or organic liquid as ancillary blowing agent.

The blowing agent is water or else a mixture with the following ancillary blowing agents inert gases, such as $CO_2$, nitrogen, argon, hydrocarbons, such as propane, butane, pentane, hexane, aliphatic alcohols, such as methanol, ethanol, propanol, isopropyl alcohol, butanol, aliphatic ketones, such as acetone or methyl ethyl ketone, aliphatic esters, such as methyl or ethyl acetate, fluorohydrocarbons (e.g. 134a, 152a), a mixture of these.

Particular preference is given to water, and also to mixtures of water with up to 100 parts by weight, based on 100 parts by weight of water, of an alcohol or of a ketone with a boiling point between 50 and 100° C.

The amounts used of the blowing agent are from 1 to 10% by weight, preferably from 2 to 8% by weight, based on the thermoplastics. It is possible to add conventional auxiliaries, e.g. nucleating agents, to regulate the number of cells.

Surprisingly, it has been found that foam webs of particularly low density are obtained if the polymer used comprises a mixture of a high-molecular-weight and a low-molecular-weight polysulfone or polyether sulfone, preferably in a mixing ratio of from 5:1 to 1:5. It is preferable here for the flowability MVR 360° C./10 kg to ISO 1133 of the high-molecular-weight polymer to be below 75 [$cm^3$/10 min], and that of the low-molecular-weight polymer to be greater than 80 [$cm^3$/10 min].

The process of the invention is preferably carried out on a plant composed of two extruders. In the first extruder, the thermoplastic is firstly melted at above its glass transition temperature, then the blowing agent is injected into the melt under pressure and homogeneously mixed with the same, whereupon the glass transition temperature of the mixture falls. In the second extruder, the mixture is cooled to a temperature at which the viscosity of the melt is still sufficiently high to form a good foam. Finally, the mixture is extruded into the open atmosphere, whereupon it foams. If a slot die is used, the foam sheets obtained preferably have a thickness of from 0.5 to 8 cm and a density of from 30 to 100 g/l.

The proportions of materials mentioned in the example are percentages by weight.

EXAMPLE 1

The foam specimens were extruded on a tandem plant. This is composed of a melting extruder and a cooling extruder.

A polyether sulfone (ULTRASON 2010 from BASF AG) is fed to the first extruder. The polymer is melted, and the blowing agent or the mixture of the blowing agent is injected and then mixed into the melt, the temperature of which is 340° C. The melt comprising blowing agent is then cooled in the second extruder to the temperature needed for foaming (see table). After discharge from a slot die, the melt foams and is shaped in a calibrator to give sheets.

| Experiment | $H_2O$ (%) | Acetone (%) | ST (° C.) | Thickness (mm) | Density (g/l) |
|---|---|---|---|---|---|
| 1 |   | 5 | 246.5 | 11 | 46 |
| 2 | 1 | 4 | 249.1 | 11 | 43 |
| 3 | 2 | 3 | 249.4 | 10 | 46 |
| 4 | 2 | 2 | 248.7 | 10 | 52 |
| 5 | 3 | 1 | 248.1 | 10 | 63 |
| 6 | 2 |   | 243.8 | 10 | 82 |
| 7 | 2 |   | 247.8 | 10 | 124 |
| 8 | 1.5 |   | 250.2 | 10 | 178 |

Experiments 1 and 2 are non-inventive.

EXAMPLE 2

As described in Example 1, foam sheets were produced from polyether sulfone. Instead of a single grade, a mixture composed of a free-flowing, low-viscosity PES (low molecular weight) and a low-flowability, high-viscosity PES (high molecular weight) was foamed.

The materials used are PES E1010, E2010, and E3010 from BASF.

The following MFR values describe the flowability of these materials.

|   | MVR 360° C./10 kg ($cm^3$/10 min) ISO 1133 |
|---|---|
| E1010 | 150 |
| E2010 | 77 |
| E3010 | 40 |

The mixture of grades has broad molecular weight distribution and can be foamed with water as sole blowing agent to give lower densities than those given by the individual components.

| E1010 (%) | E2010 (%) | E3010 (%) | $H_2O$ (%) | Density (g/l) |
|---|---|---|---|---|
| 100 |   |   | 3 | 84 |
|   | 100 |   | 3 | 82 |
|   |   | 100 | 3 | 98 |
| 67 |   | 33 | 3 | 66 |

We claim:

1. A process for producing foam webs by mixing thermoplastic polymers and from 1 to 10% by weight, based on the thermoplastic polymers, of a volatile blowing agent at above 300° C. under pressure and extruding the mixture into the open atmosphere, which comprises using as a blowing agent, water or a mixture of water with up to 200 parts by weight, based on 100 parts by weight of water, of an inert gas or organic liquid as ancillary blowing agent, wherein the thermoplastic polymers are a mixture of a high-molecular weight and a low-molecular weight polysulfone or polyether sulfone and wherein the flowability MVR 360° C./10 kg to ISO 1133 of the high-molecular weight polysulfone or polyether sulfone is below 75 cm$^3$/10 min and the flowability of the low-molecular weight polysulfone or polyether sulfone is above 80 cm$^3$/10 min.

2. The process as claimed in claim 1, wherein the blowing agent is water or a mixture of water with up to 100 parts by weight, based on 100 parts by weight of water, of an alkanol or of an aliphatic ketone with boiling point between 50 and 100° C. as ancillary blowing agent.

3. The process as claimed in claim 1, wherein use is made of a mixture of a high-molecular-weight and a low-molecular-weight polysulfone or polyether sulfone in a mixing ratio of 5:1 to 1:5.

* * * * *